United States Patent [19]

Miyamoto

[11] 3,967,313
[45] June 29, 1976

[54] CHROMINANCE SIGNAL GAIN CONTROL CIRCUIT

[75] Inventor: Seiji Miyamoto, Yao, Japan
[73] Assignee: Sanyo Electric Co., Ltd., Japan
[22] Filed: Mar. 19, 1974
[21] Appl. No.: 452,557

[30] Foreign Application Priority Data
Mar. 20, 1973 Japan................................ 48-33933

[52] U.S. Cl. .................................................. 358/27
[51] Int. Cl.² ........................................... H04N 9/535
[58] Field of Search ..................... 358/27, 28, 40, 20

[56] References Cited
UNITED STATES PATENTS

| | | | |
|---|---|---|---|
| 2,921,122 | 1/1960 | Macovski | 358/27 |
| 3,604,844 | 9/1971 | Ross | 358/27 |
| 3,708,613 | 1/1973 | Nakabe et al. | 358/27 |
| 3,717,728 | 2/1973 | Smeulers | 358/27 |
| 3,764,734 | 10/1973 | Srivastava et al. | 358/27 |

*Primary Examiner*—Robert L. Griffin
*Assistant Examiner*—R. John Godfrey
*Attorney, Agent, or Firm*—Staas & Halsey

[57] ABSTRACT

A chrominance signal gain control circuit comprising a band pass amplifier of a gain control type for amplifying a signal including a burst signal and a chrominance signal while the gain thereof is controllable as a function of a control voltage input, a burst amplifier responsive to the output from the band pass amplifier and a burst extracting pulse, such as a flyback pulse, for extracting and amplifying the burst signal, and an automatic color control detecting circuit responsive to the output from the burst amplifier for providing a peak detected output of the burst signal to the band pass amplifier as a control voltage input, whereby an automatic chrominance signal control is achieved, said circuit further comprising means for providing to the band pass amplifier as another control voltage input a pulse signal having a pulse width and a phase time covering the burst signal, the magnitude of which pulse signal is controllable manually or automatically. Manual adjustment of the magnitude of the pulse signal enables a color saturation control, while automatic adjustment thereof as a function of a color killer voltage enables a color killer operation and automatic adjustment thereof as a function of a peak detected output of the chrominance signal from the band pass amplifier enables a peak color control.

8 Claims, 7 Drawing Figures

CHROMINANCE SIGNAL GAIN CONTROL CIRCUIT

BACKGROUND OF THE INVENTION

1. Field of the Invention

The present invention relates to a chrominance signal gain control circuit. More specifically, the present invention relates to an improvement in a manner of controlling the gain of an automatic color control circuit.

2. Description of the Prior Art

FIG. 1 shows a block diagram of a typical prior art automatic color control circuit commonly used in a color television receiver. An intermediate frequency signal is amplitude detected by a detector 9 and the resultant composite video signal is amplified by a video amplifier 10. The composite video signal, as amplified, is applied to a band pass transformer 11, where a chrominance signal as well as a burst signal are extracted. The chrominance signal as well as the burst signal, thus extracted, are applied to a first band pass amplifier 12 and further to a second band pass amplifier 13. A portion of the output from the first band pass amplifier 12 is applied to a burst amplifier 14, where the burst signal is extracted, as a function of a pulse output from pulse source circuit 15, and amplified. The pulse may be a flyback pulse obtainable from a horizontal scan circuit as the circuit 15 or of a delayed horizontal synchronizing pulse obtainable from a synchronization separating circuit as the circuit 15. The burst signal, as extracted and amplified, is applied to an automatic color control detecting circuit (ACC detector) 16 and is amplitude detected thereby. An output from the automatic color control detecting circuit 16 is applied to a control electrode of the first band pass amplifier 12 for control of the gain thereof as a function of the output from the circuit 16. It is to be understood that a closed loop for automatic color control is implemented by the first band pass amplifier 12, the burst amplifier 14, and the automatic color control detecting circuit 16, such that the burst signal output from the band pass amplifier 12 may be of controlled to be constant amplitude in spite of changes in the amplitude of the input signal. FIG. 2 is a graph showing relation between the gain of the first band pass amplifier 12 (ordinate) and the control voltage obtained from the automatic color control detecting circuit 16 (abscissa). As seen from the FIG. 2 graph, such a relation is rather linear.

More detailed description will be made of the operation of automatic color control with particular reference to FIG. 1. As seen from the FIG. 2 graph, the gain control characteristic of the first band pass amplifier 12 is of such a type that a control voltage increasing in a positive going direction as applied to the control electrode of the amplifier 12, increases the gain of the amplifier 12. Now assuming that the input signal to be applied to the first band pass amplifier 12 becomes larger, the output control voltage from the automatic color control detecting circuit 16 becomes lower and accordingly the gain of the amplifier 12 decreases, with the result that the magnitude of the output burst signal from the amplifier 12 is likely to be kept constant.

In general, the amplitude of the chrominance signal may range in magnitude up to a limit that satisfies the following equation:

$$V2 < 2V1$$

where

V2 is the amplitude of the chrominance signal, and

V1 is the amplitude of the burst signal in the band pass amplifier, as seen in FIG. 3, which shows a wave form of the chrominance signal as well as the burst signal.

However, the ratio of V1 versus V2 varies depending upon the broadcasting stations. Therefore, if the magnitude of the chrominance signal (V2) is controlled in response to the magnitude of the burst signal (V1), a disadvantage will result in practice. More specifically, proper automatic color control could be provided in reception from one broadcasting station, while the chrominance signal could be in a saturated condition in reception from another broadcasting station, although the magnitude of the burst signal has been controlled properly in both cases.

SUMMARY OF THE INVENTION

Briefly described, the present invention is directed to a chrominance signal gain control circuit for the color band pass amplifier in a color television apparatus, such as a color television receiver, wherein a pulse signal having a phase time corresponding to or covering the burst signal is applied to a band pass amplifier to which an automatic color control voltage is applied, or to any other gain control amplifier which may be provided in advance of the band pass amplifier, whereby adjustment of the magnitude of the said pulse signal causes the gain of the amplifier during a burst signal period of time versus the gain of the amplifier during a horizontal scanning period of time, to be controlled relatively to each other, thereby controlling the magnitude of the chrominance signal.

Therefore, a primary object of the present invention is to improve a manner of controlling the gain of an automatic color control circuit in a color television apparatus.

An aspect of the present invention is to manually or automatically control the magnitude of the chrominance signal, in cooperation with a conventional automatic color control circuit by using a pulse signal having a pulse width and a phase time which encompasses the burst signal of the received, composite video signal in a color television apparatus.

These and other objects and features of the present invention will be better understood from the following detailed description of the preferred embodiments when taken in conjunction with the accompanying drawings.

Figure 1:
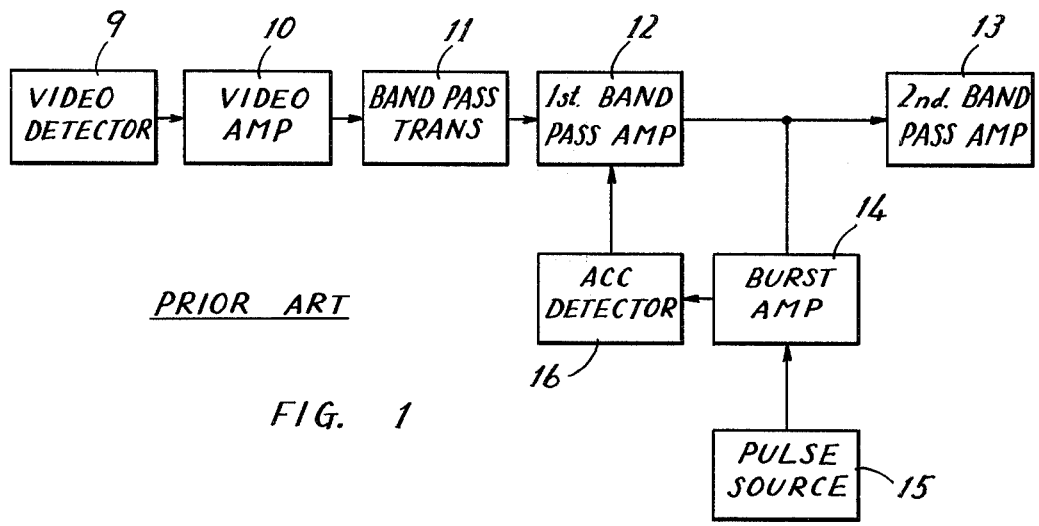
FIG. 1 shows a block diagram of a typical prior art automatic color control circuit commonly used in a color television apparatus.
Figure 2:
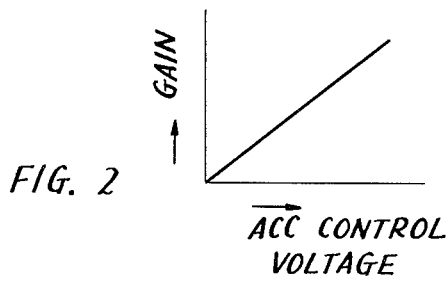
FIG. 2 is a graph showing a relation between the gain of the band pass amplifier and the automatic color control voltage.
Figure 3:
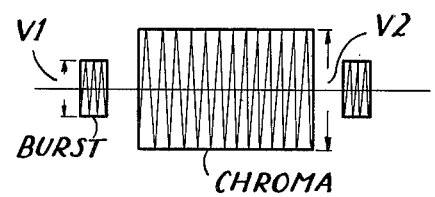
FIG. 3 shows a wave form of the chrominance signal and the burst signal.
Figure 4:
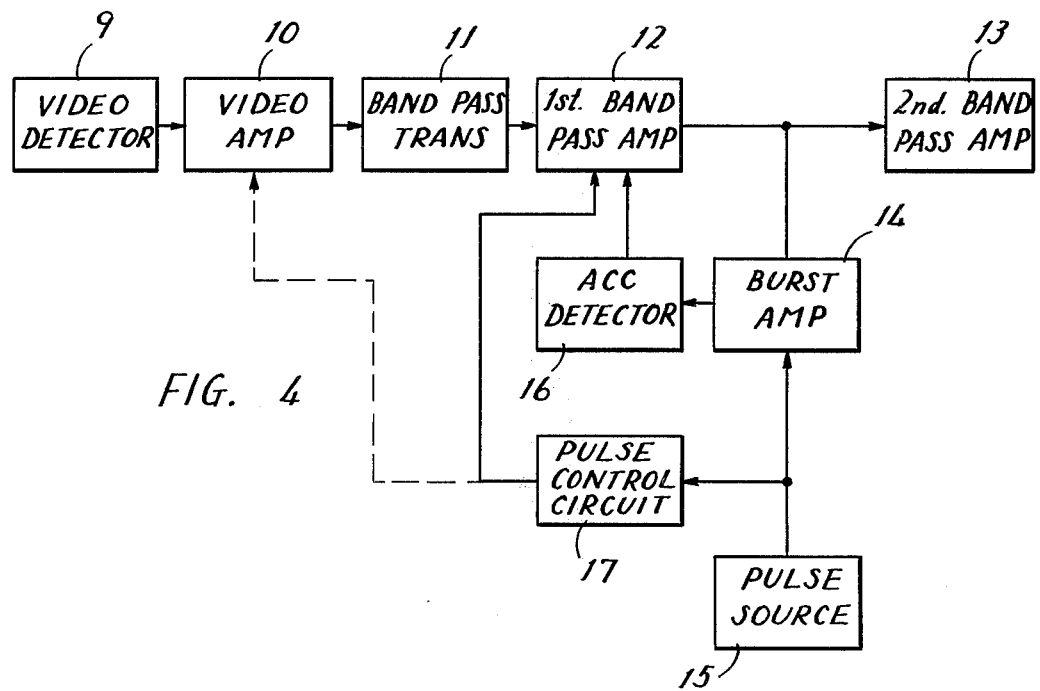
FIG. 4 illustrates a block diagram of an embodiment of a chrominance signal gain control circuit in accordance with the present invention.

DESCRIPTION OF THE PREFERRED EMBODIMENTS:

FIG. 4 illustrates a block diagram of a chrominance signal gain control circuit in accordance with the present invention. A significant feature of the present invention is that a burst extracting pulse or a burst sampling pulse is produced and is applied to a control signal input of the first band pass amplifier 12, for example, through a burst extracting pulse control circuit 17, a gain of which is controllable manually or automatically. The remaining portions of the FIG. 4 diagram are substantially the same as those in the FIG. 1 diagram and therefore more detailed description thereof will be omitted.

Figure 5:
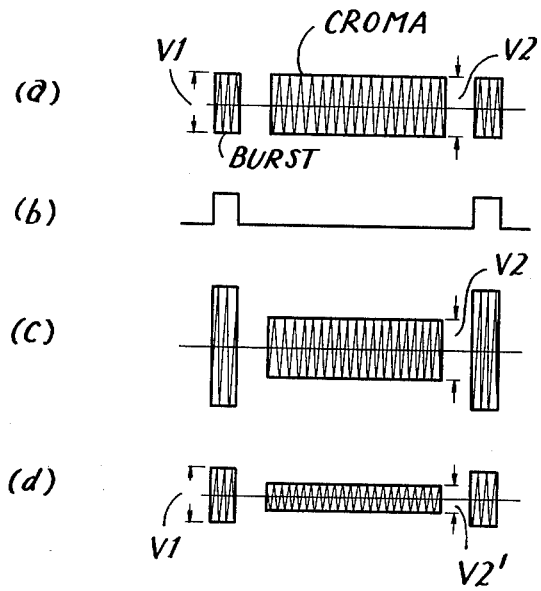
FIG. 5 shows a waveform for explanation of operation of the FIG. 4 embodiment.

For the purpose of describing the operation of the FIG. 4 embodiment, first let it be assumed that the signal input circuit of the first band pass amplifier 12 is supplied with an input signal as shown in FIG. 5(a). In such a situation, further let it be assumed that the automatic color control circuit is cut off or disabled and the control input circuit of the first band pass amplifier 12 is supplied with a burst extracting pulse, as shown in FIG. 5(b). Then, the gain of the first band pass amplifier 12 increases only during the time period of the burst extracting pulse, so that an output as shown in FIG. 5(c) is obtained at the output of the amplifier 12. Now assume that the automatic color control circuit is properly connected or enabled. Then the automatic color control circuit will operate responsive only to the magnitude of the burst signal (V1), without any regard to the magnitude of the chrominance signal (V2), with the result that the gain of the first band pass amplifier 12 is controlled such that the magnitude of the burst signal (V1) may be kept constant. As a result, the output from the first band pass amplifier 12 becomes V2', as shown in FIG. 5 (d), which means that the magnitude of the chrominance signal is made to be smaller relatively as compared with the magnitude of the burst signal (V1).

If the gain of the pulse control circuit 17 is adjusted manually, or automatically in response to any suitable control signal as to be more fully described hereinafter, such that the magnitude of the pulse applied to the first band pass amplifier 12 is accordingly controlled, then the magnitude of the chrominance signal is accordingly controlled. If a voltage representative of the presence or absence of the burst signal, e.g. a color killer voltage, is used as the control signal to be applied to the pulse control circuit 17 for automatic adjustment thereof, the pulse control circuit 17 serves to operate as a color killer circuit. On the other hand, a manual adjustment of the pulse control circuit 17 performs substantially the same function as a color saturation adjustment. Conventionally, color saturation adjustment has been made using a variable resistor provided between the first and second band pass amplifiers 12 and 13, which usually makes the circuit concerned complicated. By contrast, color saturation adjustment can be implemented by a simple circuit in accordance with the abovementioned embodiment, inasmuch as the gain of the pulse control circuit 17 can be done in a DC control manner.

As an alternative embodiment, the video amplifier 10 may be an amplifier of a gain control type, a control voltage input of which is supplied with the output from the pulse control circuit 17. For example, the video amplifier 10 may be a gain control amplifier and accordingly the control pulse output of the circuit 17 may in the alternative be applied to the control input electrode of the video amplifier 10 rather than to the input of band pass amplifier 12, as shown by dotted line in FIG. 6, as well as in FIG. 4. In other words, a gain control of only the burst signal for the purpose of the present invention can be done using not only the band pass amplifier 12 of a gain control type but also any amplifier of a gain control type provided in a stage preceding the band pass amplifier 12. It is to be pointed out that the present invention covers such alternative embodiments.

Figure 6:
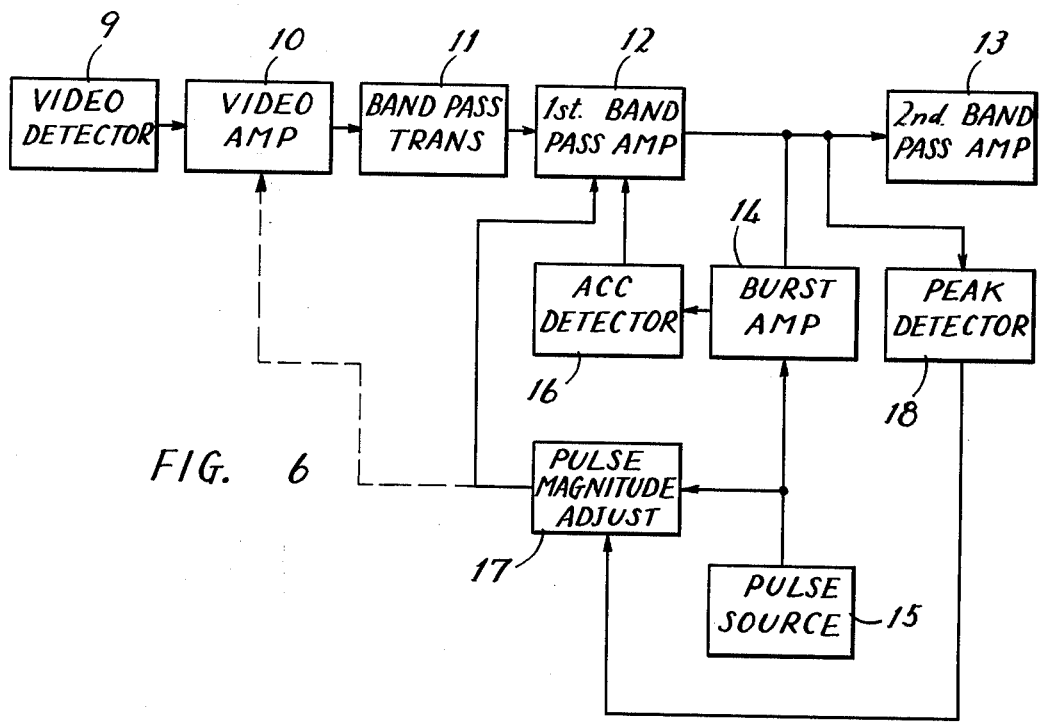
FIG. 6 shows a block diagram of a preferred embodiment of the present invention.

FIG. 6 shows a block diagram of a preferred embodiment of the present invention, wherein the gain of the pulse control circuit 17 is automatically adjusted in response to a different control signal. More specifically, the FIG. 6 embodiment is directed to a peak color control, in which only if and when a peak of the chrominance signal exceeds a predetermined value, the pulse control circuit (pulse magnitude adjust) 17 is enabled to control the first band pass amplifier 12 such that the peak of the chrominance signal may be kept constant. A portion of the output from the first band pass amplifier 12 is applied to peak detector 18, where an output is obtainable only if and when a peak of the chrominance signal exceeds a predetermined value. The output from the peak detector 18 is applied to the control input of the pulse control circuit 17. The other portions of the FIG. 6 embodiment are substantially the same as those in the FIG. 4 embodiment and therefore more detailed description thereof will be omitted.

In operation, when a peak of the chrominance signal exceeds a predetermined value or V2 becomes larger than 2V1, a peak detected output is obtained from the peak detector 18 and is applied to the control input of the pulse control circuit 17 to increase the gain of the circuit 17. In response thereto, the band pass amplifier 12 amplifies the burst signal selectively, as compared with the chrominance signal. On the other hand, the chrominance signal as well as the burst signal will be made smaller through the automatic color control operation of the automatic color control detecting circuit 16. As a result, the chrominance signal is selectively made smaller as compared with the burst signal. Thus a peak color control can be achieved.

Figure 7:
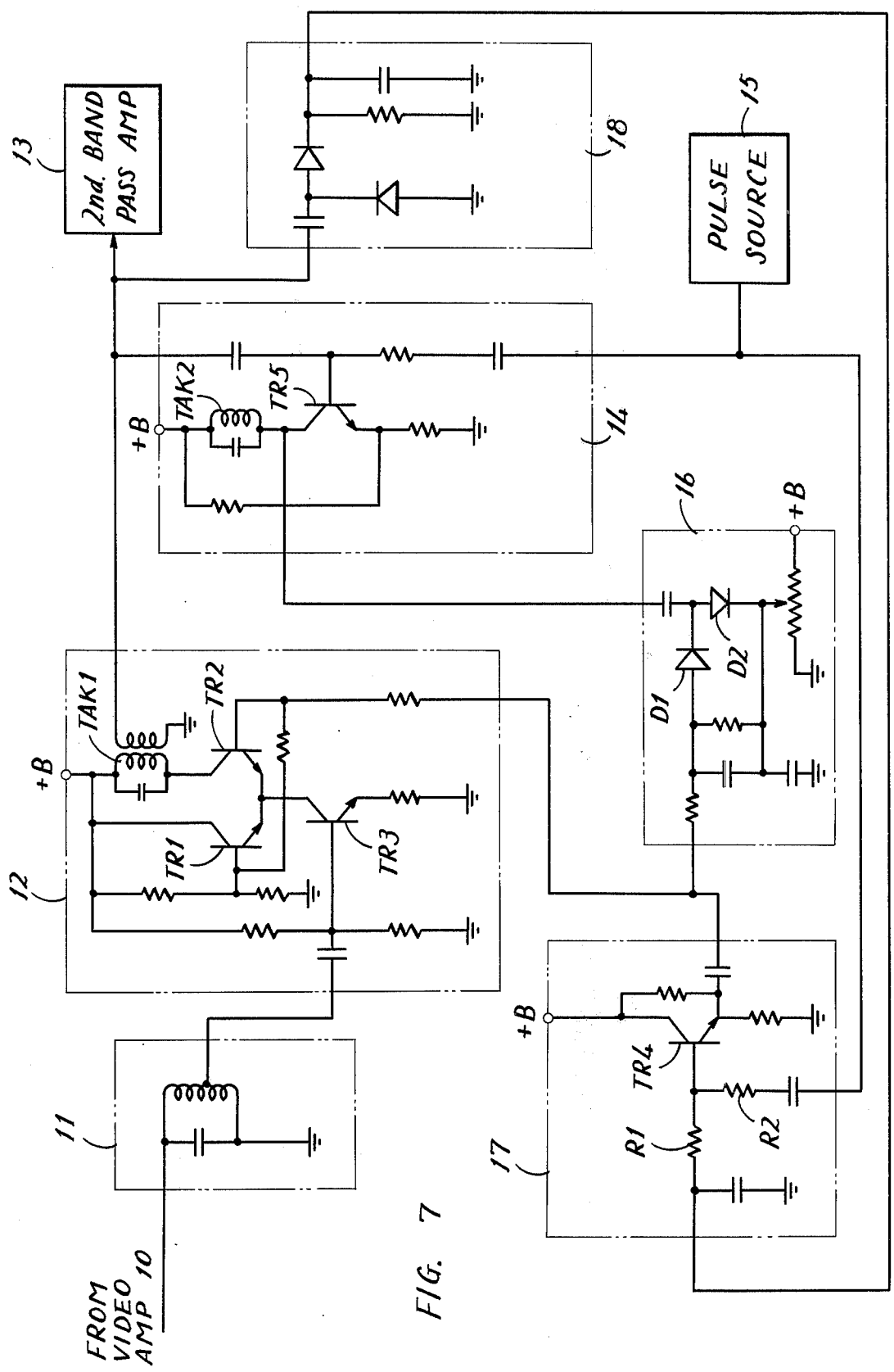
FIG. 7 shows a schematic diagram of the FIG. 6 embodiment.

A schematic diagram of the FIG. 6 embodiment is shown in FIG. 7, in which the same blocks are denoted by the same reference characters. The first band pass amplifier 12 comprises a differential amplifier comprising transistors TR1 and TR2, and a signal input circuit implemented by a transistor TR3. The chrominance signal input as well as the burst signal input is applied to the base of the transistor TR3 and an output therefrom is applied to the differential amplifier. A control electrode of the transistor TR1 is fixed to a predetermined potential, while a control electrode of the transistor TR2 is supplied with an automatic color control signal from the detecting circuit 16. In accordance with the FIG. 7 embodiment of the present invention, the control electrode of the transistor TR2 is further supplied with the output from the pulse control circuit 17. An output from the first band pass amplifier 12 is taken out through a tank circuit TAK1 and is applied to the second band pass amplifier 13, the burst amplifier 14 and the peak detector 18.

The burst amplifier 14 comprises a transistor TR5 and a tank circuit TAK2 tuned to the frequency of the burst signal. The input electrode of the transistor TR5 is supplied with a chrominance signal as well as a burst signal from the amplifier 12 and a burst extracting pulse from the pulse source 15. The output from the amplifier 14 is applied to the automatic color control detecting circuit 16. The circuit 16 comprise a peak detecting circuit comprising diodes D1 and D2 and an output therefrom is applied to the control input of the first band pass amplifier 12. The pulse control circuit 17 comprises a gain control amplifier comprising a transistor TR4 and the input electrode thereof is supplied with a pulse signal input through a resistor R2 from the pulse source 15 and a control input through a resistor R1 from the peak detector 18.

It is to be understood that the emitter of the transistor TR4 is biased to a predetermined value. Therefore, an output from the peak detector 18 that is of a smaller value is not large enough to enable conduction of the transistor TR4. However, when the output from the detector 18 exceeds a predetermined value, the transistor TR4 is enabled for conduction, so that the circuit 17 provides a pulse output in response to the pulse input signal from the pulse source 15 the pulse having an amplitude in proportion to the output from the detector 18. The pulse output from the circuit 17 is applied to the input electrode of the transistor TR2 of the amplifier 12, which thereby selectively amplifies the burst signal, changing the relative amplitude relationship between the burst and chrominance signals. More specifically, when the pulse output is applied to the base of the transistor TR2, the transistor TR2 becomes more conductive as compared with the transistor TR1, which means that the gain of the amplifier 12 becomes larger only during a burst signal time period. The automatic color control loop, as mentioned previously, then operates to reduce the amplitude of the composite signal in response to the peak detection of the amplified burst signal, through circuits 14 and 16. As a result, peak color control is achieved.

While specific preferred embodiments of the present invention have been described, it will be apparent that obvious variations and modifications of the invention will occur to those of ordinary skill in the art from a consideration of the foregoing description. It is, therefore, desired that the present invention be limited only be the appended claims.

I claim:

1. A chrominance signal control circuit in a color television apparatus, comprising:
    amplifying means of a gain control type for selectively amplifying a composite signal including a burst signal and a chrominance signal, the gain thereof being controllable as a function of a control voltage input,
    means for providing a pulse signal having a pulse width and a phase time encompassing the burst signal of said composite signal,
    means receiving the selectively amplified composite signal output of said amplifying means and responsive to the pulse signal from said pulse signal providing means for extracting the burst signal from the selectively amplified composite signal,
    means for receiving and peak detecting the extracted burst signal and supplying the peak detected burst signal output thereof to said amplifying means as the control voltage input,
    means receiving the selectively amplified composite signal output of said amplifying means and providing a peak detected output of the chrominance signal only, of said composite signal, when the peak detected chrominance signal output exceeds a predetermined value, and
    means responsive to the burst extracting pulse signal for producing a control pulse output, said means receiving the peak detected chrominance signal output for automatically adjusting the magnitude of the control pulse and supplying the control pulse to said amplifying means for selectively controlling the gain thereof for amplification of the burst signal, thereby to afford peak color control of the selectively amplified, composite signal output of said first amplifying means.

2. The chrominance signal control circuit in accordance with claim 1, in which said automatic adjusting means is operable as a function of a color disabling voltage, thereby affording color disabling operation.

3. The chrominance signal control circuit as recited in claim 1 wherein said gain control amplifying means comprises:
    a first amplifying means receiving the composite signal and responsive to the control pulse output of said means for automatically adjusting the magnitude of the pulse signal, for selectively amplifying the burst signal of the composite signal, and producing an output composite signal having the burst signal thereof selectively amplified, and
    second amplifying means receiving the output of said first amplifying means and responsive to the control voltage input thereto, received from said means for providing a peak detected output from said extracted burst signal, for adjusting the gain thereof and correspondingly the amplification of the composite signal output having the selectively amplified burst signal, as produced by said first amplifying means.

4. The chrominance signal control circuit as recited in claim 3 wherein said first amplifying means comprises a video amplifier connected in a stage preceding said second amplifying means.

5. The chrominance signal control circuit as recited in claim 4 wherein said second amplifying means comprises a band pass amplifier.

6. The chrominance signal control circuit as recited in claim 1 wherein said amplifying means has a first input for receiving the composite signal comprising a burst signal and a chrominance signal, and a second input for receiving in common the control pulse for control of the gain thereof for selectively amplifying the burst signal of the composite signal, and the control voltage input for control of the gain thereof for amplification of the composite signal comprising the burst signal and the chrominance signal.

7. A chrominance signal control circuit in a color television apparatus, comprising:
    amplifying means of a gain control type for selectively amplifying a composite signal including a burst signal and a chrominance signal, the gain thereof being controllable as a function of a control voltage input, and, selectively, as a function of a control pulse input,
    means for providing a pulse signal having a pulse width and a phase time encompassing the burst signal of said composite signal, means receiving the selectively amplified composite signal output of said amplifying means and responsive to the pulse signal from said pulse signal providing means for extracting the burst signal from the selectively amplified composite signal, means for receiving and peak detecting the extracted burst signal and supplying the peak detected burst signal output thereof to said amplifying means as the control voltage input, means receiving the selectively amplified composite signal output of said amplifying means and providing a peak detected output of the chrominance signal only, of said composite signal, when the peak detected chrominance signal output exceeds a predetermined value, and means responsive to the burst extracting pulse signal for producing a control pulse output having a pulse width and a phase time encompassing the burst signal of said composite signal, and responsive to the peak detected chrominance signal output for automatically adjusting the magnitude of the control pulse output thereof and supplying the control pulse to said amplifying means for selectively controlling the gain of said amplifying means during said phase time encompassing the burst signal of said composite signal, such that an increase of said peak detected chrominance signal output adjusts the magnitude of the control pulse output to increase the gain of said amplifying means for selective amplification of the burst signal, and the control voltage produced in accordance with the peak detected burst signal output reduces the gain of said amplifying means, thereby to afford peak color control of the selectively amplified, composite signal output of said amplifying means.

8. A chrominance signal control circuit in a color television apparatus, comprising:

band pass amplifying means of a gain control type having a first input for receiving the composite signal comprising a burst signal and a chrominance signal, and a second input for receiving both a control voltage and a control pulse input for control of the gain thereof, means for providing a pulse signal having a pulse width and a phase time encompassing the burst signal of said composite signal, means receiving the selectively amplified composite signal output of said amplifying means and responsive to the pulse signal from said pulse signal providing means for extracting the burst signal from the selectively amplified composite signal, means for receiving and peak detecting the extracted burst signal and supplying the peak detected burst signal output thereof to said amplifying means as the control voltage input thereto means receiving the composite signal output of said amplifying means and providing a peak detected of the chrominance signal only, of said composite signal output, when the peak detected chrominance signal output exceeds a predetermined value, and means responsive to the burst extracting pulse signal for producing a control pulse output and receiving the peak detected chrominance signal output for automatically adjusting the magnitude of the control pulse output thereof and supplying the control pulse as said control pulse input to said amplifying means for selectively controlling the gain thereof for selective amplification of the burst signal, thereby to afford peak color control of the selectively amplified, composite signal output of said amplifying means.

* * * * *

UNITED STATES PATENT AND TRADEMARK OFFICE
CERTIFICATE OF CORRECTION

PATENT NO. : 3,967,313
DATED : June 29, 1976
INVENTOR(S) : Seiji Miyamoto

It is certified that error appears in the above-identified patent and that said Letters Patent are hereby corrected as shown below:

Column 1, line 28, delete "of".

Column 5, line 30, after "changing" insert --therefor--.

Column 5, line 48, change "be" to --by--.

Signed and Sealed this

Twelfth Day of October 1976

[SEAL]

Attest:

RUTH C. MASON
Attesting Officer

C. MARSHALL DANN
Commissioner of Patents and Trademarks